United States Patent
Uchida et al.

(10) Patent No.: US 8,530,082 B2
(45) Date of Patent: Sep. 10, 2013

(54) METHOD FOR MANUFACTURING ELECTRODE FOR BATTERY

(75) Inventors: Yozo Uchida, Toyota (JP); Yoshiki Ohsawa, Suita (JP); Tatsuya Hashimoto, Osaka (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 596 days.

(21) Appl. No.: 12/680,976

(22) PCT Filed: Jul. 6, 2009

(86) PCT No.: PCT/JP2009/062304
§ 371 (c)(1),
(2), (4) Date: Mar. 31, 2010

(87) PCT Pub. No.: WO2011/004447
PCT Pub. Date: Jan. 13, 2011

(65) Prior Publication Data
US 2011/0183211 A1    Jul. 28, 2011

(51) Int. Cl.
*H01M 4/04*    (2006.01)
(52) U.S. Cl.
USPC .................................... 429/209; 429/231.1
(58) Field of Classification Search
USPC .............................. 429/209, 231.1
See application file for complete search history.

(56) References Cited

U.S. PATENT DOCUMENTS

2003/0170534 A1    9/2003    Kim et al.

FOREIGN PATENT DOCUMENTS

| JP | 8-69791 | 3/1996 |
|---|---|---|
| JP | 11-204108 | 7/1999 |
| JP | 11-213990 | 8/1999 |
| JP | 2002-141059 | 5/2002 |
| JP | 2002-298922 | 10/2002 |
| JP | 2003-263988 | 9/2003 |
| JP | 2008-123791 | 5/2008 |
| JP | 2008-181726 | 8/2008 |
| JP | 2008-226515 | 9/2008 |

OTHER PUBLICATIONS

Office Action from the Korean Patent Office for Korean Appl. No. 10-2010-7007043 dated Nov. 28, 2011.
Translation of the International Preliminary Report on Patentabilty for PCT/JP2009/062304 dated Feb. 23, 2012.

*Primary Examiner* — Stuart Hendrickson
(74) *Attorney, Agent, or Firm* — Finnegan, Henderson, Farabow, Garrett & Dunner, LLP

(57) ABSTRACT

The invention provides a method for manufacturing a battery electrode having a configuration in which an electrode active material layer including an electrode active material is held on an electrode collector. The method includes a step of mixing the electrode active material with a solvent and preparing an electrode active material paste (step S10), a step of admixing and dispersing microbubbles in the prepared electrode active material paste to obtain a low-density electrode active material paste that has a density lower than that before the admixing (step S20), and a step of coating the electrode collector with the low-density electrode active material paste (step S30).

10 Claims, 4 Drawing Sheets

CO2 MICROBUBBLE TREATMENT

METHOD FOR MANUFACTURING ELECTRODE FOR BATTERY

CROSS-REFERENCE TO RELATED APPLICATIONS

This application is a national phase application of International Application No. PCT/JP2009/062304, filed Jul. 6, 2009, the contents of which are incorporated herein by reference.

TECHNICAL FIELD

The present invention relates to a method for manufacturing an electrode for a battery, and more particularly to a method for manufacturing an electrode for a battery that has a configuration in which an electrode active material layer including an electrode active material is supported on a collector.

BACKGROUND ART

Lithium ion batteries, nickel hydrogen batteries and other secondary batteries have recently gained importance as power sources for installation on vehicle or power sources for personal computers and portable terminals. In particular, lightweight lithium ion batteries that make it possible to obtain a high energy density are expected to be advantageously used as high-output power sources for installation on vehicles.

A typical configuration of a lithium ion battery includes an electrode of a configuration in which a material (electrode active material) that can reversibly absorb and desorb lithium ions is formed on an electrically conductive member (electrode collector). For example, an oxide including lithium and a transition metal element or transition metal elements of two or more kinds as constituent metal elements can be used as a positive electrode active material for use in a positive electrode. An elongated sheet-like member based on aluminum or an aluminum alloy can be used as the electrode collector (also referred to hereinbelow as "positive electrode collector") for use in a positive electrode. Such a positive electrode for a battery is manufactured by dispersing a positive electrode active material in an adequate solvent (for example water) and kneading to prepare a positive electrode active material paste, coating a positive electrode collector with the paste and drying. Examples of the conventional techniques relating the manufacture of electrodes of such kind are described in Patent Documents 1 to 4.

Patent Document 1: Japanese Patent Application Laid-Open No. 2002-141059.
Patent Document 2: Japanese Patent Application Laid-Open No. H8-069791.
Patent Document 3: Japanese Patent Application Laid-Open No. 2008-226515.
Patent Document 4: Japanese Patent Application Laid-Open No. H11-204108.

A coating apparatus 200 such as shown in FIG. 5 is generally known as an apparatus for coating the electrode collector with the electrode active material paste. In the coating apparatus 200, as shown in FIG. 5, an elongated sheet-like electrode collector 210 is passed through a gap (coating gap d) between a backup roll 220 and a die 230, while conveying the collector by rotation of the backup roll 220, and an electrode active material paste 240 is applied from the die 230 on the electrode collector 210. A solvent (for example, water) contained in the electrode active material paste 240 is then evaporated in a drying furnace 250 and an elongated sheet-like electrode is manufactured.

Even among the equipment used to manufacture lithium ion batteries, the coating apparatus 200 is typically a high-cost unit. Accordingly, attempts have been made to reduce the cost by implementing the coating and drying operations of the electrode active material paste at a high speed and increasing the operation efficiency of the coating apparatus 200. For example, in order to increase the operation efficiency of the coating apparatus 200, it is preferred that the amount of solvent in the electrode active material paste 240 be reduced and solid fraction ratio be increased. Where the amount of solvent in the electrode active material paste 240 is reduced, the paste can be easily dried. Therefore, the drying time (time of passing through the drying furnace 250) can be reduced and the coating apparatus 200 can be operated with good efficiency.

However, where the amount of solvent in the electrode active material paste 240 is reduced, the paste density increases. Therefore, it is necessary to narrow the coating gap d and decrease the thickness of the coated film of the electrode active material paste 240. Where the coating gap d is narrowed, the electrode active material paste 240 cannot be smoothly separated from the die 230 and the behavior of the electrode active material paste 240 becomes unstable, thereby causing streaks and thickness unevenness on the coated surface.

DISCLOSURE OF THE INVENTION

The present invention has been created with the foregoing in view, and it is the main object of the present invention to provide an electrode manufacturing method that makes it possible to avoid the coating defects of the electrode active material paste and manufacture an electrode that excels in stability of quality.

The method provided according to the present invention is a method for manufacturing a battery electrode having a configuration in which an electrode active material layer including an electrode active material is held on an electrode collector. This method includes: a step of mixing the electrode active material with a solvent (for example, water) and preparing an electrode active material paste; a step of reducing a density of the electrode active material paste by admixing microbubbles to the prepared electrode active material paste; and a step of forming an electrode active material layer by coating the electrode collector with the electrode active material paste having reduced density.

The microbubbles as referred to herein are very fine gas bubbles with a diameter of a micrometer order, for example, gas bubbles with a diameter of equal to or less than about 500 µm. Because the microbubbles are gas bubbles of an extremely small size, they are prevented from bonding together and growing, the flotation rate in liquid is low, and therefore the microbubbles are retained in liquids for a long time. Thus, where microbubbles are admixed to the electrode active material paste, the microbubbles continue to remain in the paste and the paste density is decreased.

With the electrode manufacturing method in accordance with the present invention, the electrode active material paste is reduced in density by admixing the microbubbles to the electrode active material paste, and this electrode active material paste having reduced density is coated on the electrode collector. Therefore, the coating film of the electrode active material paste can be coated to a thickness larger than that in the conventional method. As a result, the coating gap required to obtain the same coated amount (calculated as a solid fraction) can be increased with respect to the process in which no microbubbles are admixed to the paste, and the occurrence of streaks and thickness unevenness on the coated surface can be prevented. Therefore, in accordance with the present invention, it is possible to avoid the coating defects of the electrode active material paste and manufacture an electrode that excels in stability of quality.

In a preferred embodiment of the manufacturing method disclosed herein, the gas bubbles with a diameter of equal to or less than 50 μm are admixed as the microbubbles in the density reduction step. The gas bubbles with a diameter of equal to or less than 50 μm have a low flotation rate and a long retention time in liquids. Therefore, the electrode active material paste can be reduced in density with good stability.

In a preferred embodiment of the manufacturing method disclosed herein, the electrode active material paste with reduced density is evacuated prior to forming the electrode active material layer.

The evacuation makes it possible to remove gas bubbles with a size (typically gas bubbles with a diameter of equal to and greater than 1 mm, preferably equal to or greater than 500 μm).

In a preferred embodiment of the manufacturing method disclosed herein, the electrode is a positive electrode for a lithium secondary battery. A lithium-containing composite oxide including lithium and one, or two or more transition metal elements as constituent metal elements may be used as the electrode active material (positive electrode active material). With such a method, it is possible to manufacture a positive electrode for a lithium secondary battery that excels in stability of quality.

In a preferred embodiment of the manufacturing method disclosed herein, carbon dioxide gas ($CO_2$) is admixed as the microbubbles in the density reduction step. By admixing the carbon dioxide gas, it is possible to adjust the pH of the electrode active material paste to 7 to 10.

The electrode active material paste in which the electrode active material such as a lithium-containing composite oxide is mixed with a solvent (for example, an aqueous solvent) easily becomes alkaline due to elution of lithium ions constituting the oxide into the solvent. Therefore, where the electrode active material paste is coated on the electrode collector (for example, an aluminum foil), the electrode collector may be corroded by the reaction of the electrode active material paste with the electrode collector (typically, alkali-induced corrosion reaction).

By contrast, with the present method, because the admixed microbubbled carbon dioxide gas neutralizes the electrode active material paste to a pH value of 7 to 10 and the neutralized electrode active material paste is coated on the electrode collector, the reaction of the electrode active material paste with the electrode collector (alkali-induced corrosion reaction) can be prevented. In addition, because the microbubbled carbon dioxide gas has a larger contact area with liquids and can be easily dissolved therein, the neutralization can be achieved with a smaller amount of carbon dioxide gas than with the typical bubbling treatment in which larger carbon dioxide gas bubbles are blown into an electrode active material paste. Further, because the microbubbled carbon dioxide gas is gradually reduced in size and slowly dissolved in liquids, the neutralization effect can be maintained better than in the conventional bubbling treatment.

Any of the methods disclosed herein can be applied especially advantageously when foil-shaped aluminum or aluminum alloy is used as the electrode collector. Foil-shaped aluminum or aluminum alloy has a variety of properties advantageous for a positive electrode collector for a lithium secondary battery, but is easily corroded by the positive electrode active material paste having alkaline properties. Therefore, where the positive electrode active material paste is coated on the positive electrode collector made from aluminum or an aluminum alloy after the paste has been neutralized by admixing the microbubbled carbon dioxide gas, the effect demonstrated by employing the features of the present invention, that is, the prevention of the positive electrode collector from corrosion can be demonstrated especially effectively.

The present invention can also provide a battery (for example, a lithium ion secondary battery) constructed by using an electrode manufactured by any of the manufacturing methods disclosed herein. Because the battery is constructed using the electrode, excellent battery performance is demonstrated. For example, by constructing the battery by using the electrode, it is possible to provide a battery that has at least one of the following properties: high electrode productivity, excellent stability of electrode quality, excellent electrode endurance, and excellent battery output characteristic.

Because such a battery excels in battery performance, as mentioned hereinabove, the battery can be advantageously used as a power source for a motor (electric motor) to be installed on a vehicle such as an automobile. Therefore, the present invention provides a vehicle (typically, an automobile, in particular an automobile equipped with an electric motor, such as a hybrid automobile, electric automobile, and a fuel cell automobile) that is provided with such a battery (may be a battery assembly in which a plurality of such batteries are connected in series) as a power source.

BEST MODE FOR CARRYING OUT THE INVENTION

Figure 1:
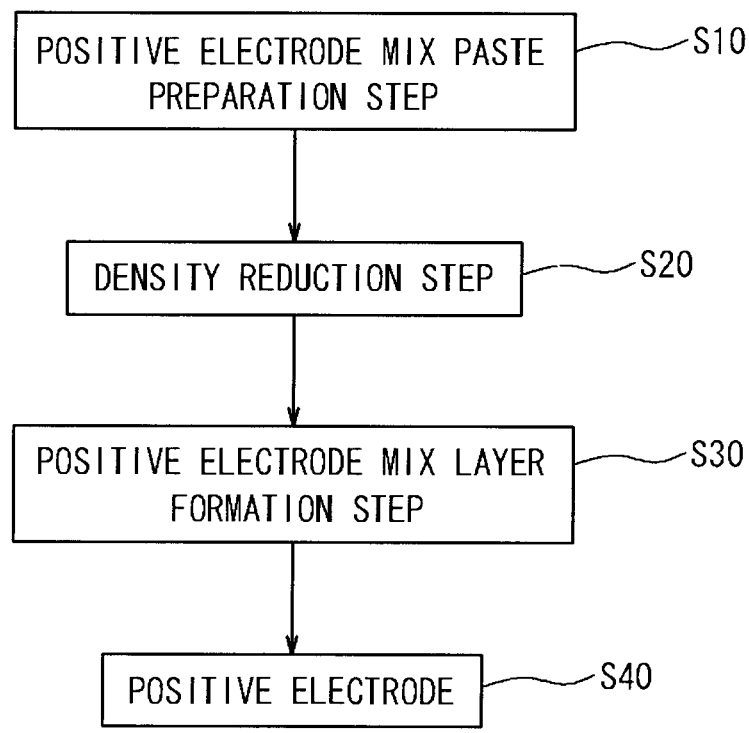
FIG. 1 is a diagram illustrating a process for manufacturing a positive electrode according to one embodiment of the present invention.

An embodiment of the present invention is described below with reference to the appended drawings. In the drawings, members and components demonstrating like actions will be assigned with like reference numerals. The size relationship in the figures (length, width, thickness, and the like) does not reflect the actual size relationship. In the present specification, a matter other than the subject specifically referred to, but necessary to carry out the invention (for example, a method for manufacturing an electrode active material, a method for preparing a composition for forming an electrode active material layer, a configuration of a separator and an electrolyte and methods for manufacturing same, a general technique relating to the construction of a lithium secondary battery, or other battery, or the like) may be understood as a design matter of a person skilled in the art on the basis of a related art in the pertinent field.

Hereinbelow, although not intended to limit specifically the present invention, a method for manufacturing a battery electrode according to the present embodiment will be mainly explained with reference to a positive electrode (positive electrode sheet) for a lithium secondary battery (typically, a lithium ion battery) having an aluminum foil-shaped positive electrode collector (aluminum foil).

First Embodiment

A method for manufacturing an electrode of the present embodiment by which a positive electrode of a lithium secondary battery is manufactured is a method for manufacturing a positive electrode (positive electrode sheet) for a battery having a configuration in which an electrode active material layer including an electrode active material is held on an electrode collector. As shown in FIG. 1, this method includes the steps of: preparing a positive electrode paste in which a positive electrode active material is mixed with a solvent (for example, water) (step S10), reducing the density of the electrode active material paste by admixing microbubbles to the prepared positive electrode active material paste (step S20), and coating with the positive electrode active material paste having reduced density a positive electrode collector (for example, an aluminum foil) to form a positive electrode active material layer (step S30).

In the positive electrode active material paste preparation process of step S10, a powder of positive electrode active material and other components forming the positive electrode active material layer that are used as necessary (for example, an electrically conductive material and a binder) are dispersed (typically, dissolved) in an appropriate solvent and kneaded to prepare a positive electrode active material paste.

One, two, or more substances that have been conventionally used in lithium secondary batteries can be used without particular restrictions as the positive electrode active material. The preferred examples include positive electrode active materials including as a main component an oxide (lithium-containing composite oxide) including lithium and one, or two or more transition metal elements, such as lithium nickel oxide ($LiNiO_2$), lithium cobalt oxide ($LiCoO_2$), and lithium manganese oxide ($LiMn_2O_4$) as constituent metal components.

The lithium nickel oxide as referred to herein means an oxide including Li and Ni as constituent metallic elements and also oxides that include Li, Ni, and also another metal element of at least one kind (that is, a transition metal element and/or a typical metal element other than Li and Ni) at a ratio that is equal to or less than that of Ni (typically at a ratio lower than that of Ni). The same is true for the lithium cobalt oxide and lithium manganese oxide. For example, a lithium-containing composite oxide powder prepared by a well-known conventional method can be directly used as the aforementioned lithium-containing composite oxide (typically, in the form of a powder). For example, a lithium-containing composite oxide powder essentially constituted by secondary particles with an average particle size generally within a range of 1 μm to 25 μm can be advantageously used as the positive electrode active material.

A carbon material such as a carbon powder or carbon fibers is preferably used as the electrically conductive material. Alternatively, a conductive metal powder such as a nickel powder may be used. In addition, various polymer materials that can function as a binder for the above-described constituent material can be used as a component of the positive electrode active material layer.

From the standpoint of reducing an environmental load, reducing a material cost, simplifying the equipment, decreasing the amount of wastes, and improving handleability, it is preferred that an aqueous solvent be used to disperse the positive electrode material, electrically conductive material, and binder. Water or a mixed solvent including water as the main component is preferably used as the aqueous solvent. One, two, or more organic solvents that can be homogeneously mixed with water (lower alcohols, lower ketones, and the like) can be appropriately selected and used as a solvent component, other than water) that constitutes the mixed solvent. For example, it is preferred that an aqueous solvent containing water at a ratio of equal to or higher than 80 wt. % (preferably, equal to or higher than 90 wt. %, more preferably equal to or higher than 95 wt. %) be used. In an especially preferred example, an aqueous solution substantially composed of water is used.

In the density reducing process of step S20, microbubbles are admixed to the positive electrode active material paste prepared in step S10 to reduce the density of the positive electrode active material paste.

Figure 2:
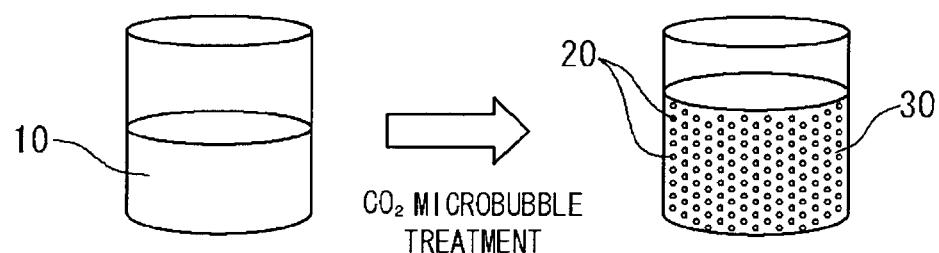
FIG. 2 illustrates schematically a positive electrode active material paste according to one embodiment of the present invention.

The microbubbles as referred to herein are fine gas bubbles with a diameter of a micrometer order, for example, having a diameter of equal to or less than 500 μm. Because microbubbles are extremely small gas bubbles, the bubbles are prevented from joining together and growing and the flotation rate thereof in a liquid is low. Therefore, the gas bubbles are retained in the liquid for a long time. As a result, where microbubbles 20 are admixed to the positive electrode active material paste 10 as shown in FIG. 2, the microbubbles 20 are continuously retained in the paste and decrease the density of the positive electrode active material paste. Therefore, a low-density positive electrode active material paste 30 is obtained.

The preferred diameter of the microbubbles 20 is about 1 μm to 500 μm, more preferably within a range of from 10 μm to 50 μm. Where the diameter of gas bubbles is greater than 500 μm, under certain operation conditions during subsequent coating and drying, the gas bubble component can become a coating defect and remain in the positive electrode active material layer. Further, where the gas bubble diameter is less than 1 μm, the gas bubbles can be gradually reduced in size in the solvent and eventually (before coating on a collector foil) dissolved, thereby making it impossible to reduce the density of the positive electrode active material paste. Therefore, it is preferred that the diameter of microbubbles be within a range of from 1 μm to 500 μm. In particular, gas bubbles with a diameter of 10 μm to 50 μm have even lower flotation rate in the liquid and are present for a long time. Therefore, such gas bubbles are preferred since the density of the positive electrode active material paste can be reduced with good stability.

Figure 5:
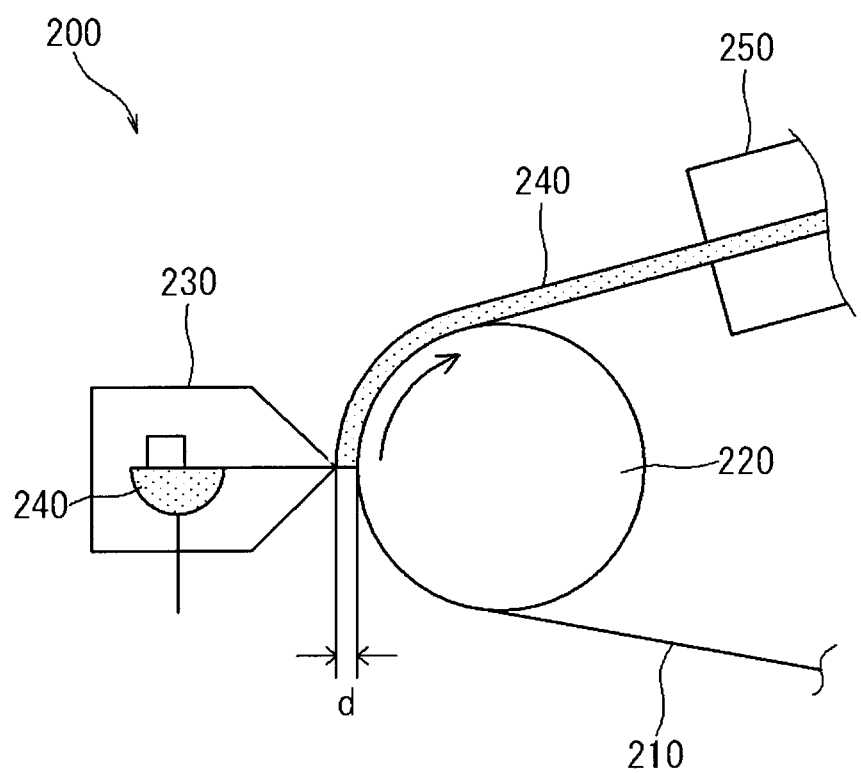
FIG. 5 illustrates schematically a coating apparatus for coating on an electrode collector with an electrode active material paste.

In one preferred mode of the technique disclosed herein, the total volume of gas bubbles container per 1 $cm^3$ of the paste with a reduced density is about 0.1 $cm^3$ to 0.5 $cm^3$, more preferably about 0.15 $cm^3$ to 0.42 $cm^3$ during coating the collector with the paste. Where the volume is below this range, an electrode active material paste 240 cannot be smoothly separated from a die 230 in a coating apparatus 200 for example such as shown in FIG. 5, the behavior of the electrode active material paste 240 becomes unstable and streaks or thickness unevenness can appear on the coating surface. Where the volume is above the aforementioned range, the microbubbles inhibit the increase in drying temperature of the coating material (electrode active material paste 240) during drying. Therefore, it is necessary to use a longer drying furnace or reduce the coating speed and the productivity can greatly decrease. Typically, the volume ratio of microbubbles in the gas bubbles contained in the paste is equal to or greater than 40 vol. %. Substantially all the gas bubbles contained in the paste may be microbubbles.

Further, the operation of admixing the microbubbles is preferably conducted so that the density of the paste is reduced by 5% or more (typically, 5% to 20%) with respect to that before the admixing. Where the density reduction ratio is below this range, the electrode active material paste 240 cannot be smoothly separated from the die 230, the behavior of the electrode active material paste 240 becomes unstable and streaks or thickness unevenness can appear on the coating surface. Where the volume is above the aforementioned range, the microbubbles inhibit the increase in drying temperature of the coating material (electrode active material paste 240) during drying. Therefore, it is necessary to use a longer drying furnace or reduce the coating speed and the productivity can greatly decrease.

Because the positive electrode active material paste is caused to adhere to the positive electrode collector, there is an adequate range for the paste viscosity. For example, from the standpoint of coatability, the preferred range of paste viscosity is about 7000 mPa·s to 18000 mPa·s. This viscosity range is also preferred from the standpoint of retaining the microbubbles with good stability.

The paste with reduced density may be further evacuated to remove large gas bubbles that can become coating defects. The evacuation as referred to herein is the treatment in which the paste is exposed to a reduced pressure. For example, the gas (typically the air) inside the container containing the paste is pumped out, for example, with a vacuum pump or the like. By reducing the pressure inside the container by the evacuation treatment to a value equal to or less than 700 mm Hg (typically, about 400 mm Hg to 700 mm Hg), preferably equal to or less than 500 mm Hg (for example, about 400 mm Hg to 500 mm Hg), it is possible to pump out and remove large bubbles (typically gas bubbles with a diameter of equal to or larger than 1 mm, preferably equal to or larger than 500 µm) contained in the paste.

The preferred degree of pressure reduction in the evacuation treatment can differ depending on the paste viscosity and content of solids therein. As one indicator, the evacuation treatment may be conducted under conditions such that gas bubbles with a diameter equal to or greater than 500 µm are substantially not present (for example, the number of gas bubbles with a diameter of larger than 500 µm is equal to or less than 50 per 1 mL of the paste). It is further preferred that the evacuation be conducted under conditions such that the gas bubbles with a diameter of equal to or greater than 500 µm are substantially not present and the gas bubbles with a diameter equal to or less than 100 µm (for example, equal to or less than 50 µm) generally remain in the liquid.

The diameter distribution of the microbubbles 20 is not particularly limited. Thus, gas bubbles having the same diameter may be dispersed in a solvent, or gas bubbles with a diameter distribution that have a plurality of diameters may be dispersed in the solvent. Any gas may be in the microbubbles 20, provided that the gas can be stably present in the paste. More specifically, it is preferred that carbon dioxide, air, nitrogen ($N_2$) gas, or argon gas be used. The gas of the microbubbles may be a one-component gas or a mixture of gas components. A method and an apparatus for generating microbubbles 20 are not particularly limited, and any method and apparatus that can generate microbubbles having the above-described diameter may be appropriately used. For example, a microbubble generating apparatus using a gas-liquid shear method or the like can be advantageously used.

In the positive electrode active material layer formation process of step S30, the positive electrode active material paste with a reduced density is coated on a positive electrode collector to form a positive electrode active material layer.

An operation (process) of coating, with the positive electrode active material paste, the positive electrode collector can be conducted in the same manner as in the case of producing a typical conventional positive electrode for a lithium secondary battery, except that a positive electrode active material paste that has been reduced in density by admixing the microbubbles as described hereinabove is used as the positive electrode active material paste. For example, the coated layer can be produced by coating to a uniform thickness, with a predetermined amount of the positive electrode active material paste, the positive electrode collector by using an appropriate coating apparatus (die coater or the like).

For example, the coating apparatus 200 such as shown in FIG. 5 can be used to coat the positive electrode collector with the positive electrode active material paste. In such a coating apparatus 200, a positive electrode collector 210 in the form of an elongated sheet is passed through a gap (coating gap d) between a backup roll 220 and a die 230, while conveying the collector by the rotation of the backup roll 220, and a positive electrode active material paste 240 is coated on the positive electrode collector 210. A solvent (for example, water) contained in the positive electrode active material paste 240 is then evaporated in a drying furnace 250 and a positive electrode in the form of an elongated sheet is produced.

In this case in order to increase the operation efficiency of the coating apparatus 200, it is desirable that the amount of solvent in the positive electrode active material paste 240 be reduced and the ratio of solid fraction be increased. Where the amount of solvent in the positive electrode active material paste 240 is reduced, the paste is easy to dry. Therefore, the drying time (time of passing inside the drying furnace 250) can be shortened and the coating apparatus 200 can be operated efficiently. However, where the amount of solvent in the positive electrode active material paste 240 is reduced, the paste density increases. Therefore, it is necessary to decrease the film thickness of the positive electrode active material paste 240 by narrowing the coating gap d. Where the coating gap d is narrowed (for example, made equal to or less than 40 µm), the positive electrode active material paste 240 cannot smoothly separate from the die 230, the behavior of the positive electrode active material paste becomes unstable, which may induce streaks or thickness unevenness appearing on the coated surface.

By contrast, in the present embodiment, because microbubbles are admixed to the positive electrode active material paste, the positive electrode active material paste is reduced in density, and the positive electrode active material paste reduced in density is coated on the positive electrode collector. Therefore, the coating process can be conducted to a film thickness of the positive electrode active material paste that is larger than in the conventional process. As a result, the coating gap d required to obtain the same coating amount (calculated as a solid fraction) can be made larger than in the case in which the microbubbles are not admixed to the paste, and the occurrence of streaks or thickness unevenness on the coated surface can be reliably prevented. Therefore, with the method of the present embodiment, coating defects of the positive electrode active material paste can be avoided and positive electrodes that excel in stability of quality can be manufactured.

By using the method of the present embodiment, even the paste with the content of solids higher than in the conventional paste can be coated with the gap d of the same width as in the conventional process. Therefore, the paste drying time can be shortened (line speed can be increased), while inhibiting the increase in the number of coating defects. As a result, the drying time can be shortened, the coating apparatus 200 can be operated with good efficiency, and the productivity of positive electrodes is high.

The solvent contained in the positive electrode active material paste is thereafter removed by evaporating the solvent (in this case, water) contained in the positive electrode with an appropriate drying means. By removing the solvent from the positive electrode active material paste, a positive electrode active material layer including a positive electrode active material is formed.

It is thus possible to obtain a sheet-like positive electrode having a configuration in which a positive electrode active material layer including a positive electrode active material is held on a positive electrode collector (step S40). The thickness or density of the positive electrode active material layer can be appropriately adjusted by conducting appropriate press processing (for example, roll press processing), if necessary, after the drying.

Second Embodiment

In the present embodiment, carbon dioxide gas is admixed as microbubbles in the density reduction process of step S20. A specific feature of this embodiment is in that pH of the positive electrode active material paste is adjusted to 7 to 10 by admixing the carbon dioxide gas.

In the preferred embodiment, a positive electrode active material paste obtained by mixing a positive electrode active material such as a lithium-containing composite oxide with an aqueous solvent is coated on a positive electrode collector, but the positive electrode active material paste including a lithium-containing composite oxide in an aqueous solvent easily becomes alkaline due to elution of lithium ions constituting the oxide into the aqueous solvent. Therefore, where such a positive electrode active material paste is coated on a positive electrode collector composed of an aluminum foil or the like, the positive electrode collector can be corroded by the reaction of the positive electrode active material paste with the positive electrode collector (typically, an alkali-induced corrosion reaction).

By contrast, in the present embodiment, in the density reduction process of step S20, the positive electrode active material paste is neutralized to pH=7 to 10 by admixing carbon dioxide gas in the form of microbubbles, and the neutralized positive electrode active material paste is coated on the positive electrode collector. Therefore, the reaction (alkali-induced corrosion reaction) of the positive electrode active material paste and the positive electrode collector can be prevented. In addition, because the carbon dioxide gas in the form of microbubbles has a large contact surface area with the liquid and is easily dissolved therein, the neutralization can be performed with a smaller amount of carbon dioxide gas than in the conventional bubbling treatment (treatment in which millimeter-size or larger gas bubbles are blown) in which carbon dioxide gas is blown into the positive electrode active material paste. Further, because the carbon dioxide gas in the form of microbubbles is gradually reduced in size in the liquid and slowly dissolves therein, the neutralization effect can be sustained better than in the conventional bubbling treatment. The adjustment of pH may be also performed for example by adjusting the amount of microbubbles admixed to the positive electrode active material paste.

Because the electrode (for example, positive electrode) of the present embodiment excels in stability of quality, as described hereinabove, the electrode can be advantageously used as a constituent element of various batteries or a constituent element (for example, a positive electrode) of an electrode assembly contained in the batteries. For example, the electrode can be advantageously used as a constituent element of a lithium secondary battery including a positive electrode manufactured by any of the methods disclosed herein, a negative electrode (can be a negative electrode manufactured by applying the present invention), an electrolyte disposed between the positive electrode and negative electrode), and typically a separator (can be omitted in the batteries using a solid or gelled electrolyte) that separates the positive and negative electrodes. The structure (for example a metallic housing or a laminated film structure) or size of the outer container constituting the battery and the structure of the electrode assembly (for example, a wound structure or a laminated structure) having positive and negative electrode collectors as the main constituent elements are not particularly limited.

Because the battery constructed in the above-described manner is constructed by using the above-described electrode (for example, the positive electrode), the battery demonstrates excellent performance. For example, by constructing a battery by using the electrode, it is possible to provide a battery that excels in at least one of the following characteristics: electrode production stability, electrode endurance, and battery output characteristic.

The present embodiment will be explained below in greater details based on specific examples.

A lithium nickel cobalt manganese oxide ($LiNi_{1/3}CO_{1/3}Mn_{1/3}O_2$) powder was used as the positive electrode active material. First, the lithium nickel cobalt manganese oxide as the positive electrode active material, acetylene black as an electrically conductive material, polyvinylidene fluoride (PVdF) as a binder, and a sodium salt of carboxymethyl cellulose (CMC) as a thickening agent were mixed in water so as to obtain a mass ratio of these materials of 95:3:1:1 and a concentration of solids of about 62 wt. % and a positive electrode active material paste was prepared (positive electrode active material paste preparation step).

Then, $CO_2$ microbubbles with an average bubble diameter of 10 μm that were generated in a microbubble generator were dispersed in water to prepare water including $CO_2$ microbubbles, and the positive electrode active material paste was added to the water including $CO_2$ microbubbles to admix the $CO_2$ microbubbles to the positive electrode active material paste (microbubble admixing step). A commercial Aura-Jet Device manufactured by Auratec Co., Ltd. was used as the microbubble generator, and the amount of microbubbles was adjusted to about 100 microbubbles/mL. The water including $CO_2$ microbubbles was charged till the concentration of solids in the positive electrode active material paste became about 45 wt. %. After the water including $CO_2$ microbubbles has been charged, the positive electrode active material paste was evacuated for 3 min at 3×10 Pa, and millimeter-size gas bubbles were removed from the positive electrode active material paste. The density and pH of the positive electrode active material paste after the evacuation were measured.

As Comparative Example 1, a positive electrode active material paste containing no $CO_2$ microbubbles was fabricated. More specifically, pure water was poured in instead of the water containing $CO_2$ microbubbles in the microbubble admixing step and a positive electrode active material paste containing no $CO_2$ microbubbles was obtained. The positive electrode active material paste was fabricated in the same manner as in the embodiment, except that pure water was poured in the microbubble admixing step, and the density and pH of the positive electrode active material paste were similarly measured. The measurement results obtained in the embodiment and Comparative Example 1 are shown in Table 1.

TABLE 1

|  | Comparative Example 1 (no microbubbles) | Embodiment (microbubbles are contained) |
| --- | --- | --- |
| Paste density | 1.85 g/cm$^3$ | 1.70 g/cm$^3$ |
| pH | 13 | 8 |

As follows from Table 1, the positive electrode active material paste of the embodiment has a paste density lower than that of the positive electrode active material paste of Comparative Example 1. In the test, the paste density decreased from 1.85 g/cm$^3$ to 1.70 g/cm$^3$. This result confirmed that the presence of microbubbles decreased the paste density. Further, the pH of the positive electrode active material paste of Comparative Example 1 increased close to 13, whereas the pH of the positive electrode active material paste of the embodiment practically did not raise from the vicinity of 8 and showed a value close to neutrality. Therefore, by admixing carbon dioxide gas as the microbubbles, the positive electrode active material paste having alkaline properties was neutralized. As a result, the effect of preventing the corrosion of the positive electrode collector was confirmed.

Further, the following test was conducted to confirm the neutralization effect of $CO_2$ microbubbles. Thus, the positive electrode active material paste of the embodiment was allowed to stay and then changes in pH after 1 to 10 days were examined. As a Comparative Example 2, the positive electrode active material paste according to Comparative Example 1 was prepared, the paste was subjected to a typical bubbling treatment (the treatment in which larger millimeter-size $CO_2$ bubbles were blown into the positive electrode active material paste), the pH value was adjusted to about 8, and changes in pH after 1 to 10 days were examined. The results are shown in FIG. 3 and Table 2.

TABLE 2

| Day | Comparative Example 2 pH | Example pH |
| --- | --- | --- |
| 1 | 8.3 | 7.9 |
| 2 | 9.3 | 8.2 |
| 3 | 10.1 | 8.1 |
| 4 | 11.2 | 8.2 |
| 5 | 12.6 | 8.3 |
| 7 | 13.1 | 8.4 |
| 9 | 13.3 | 8.7 |
| 10 | 13.2 | 8.8 |

Figure 3:
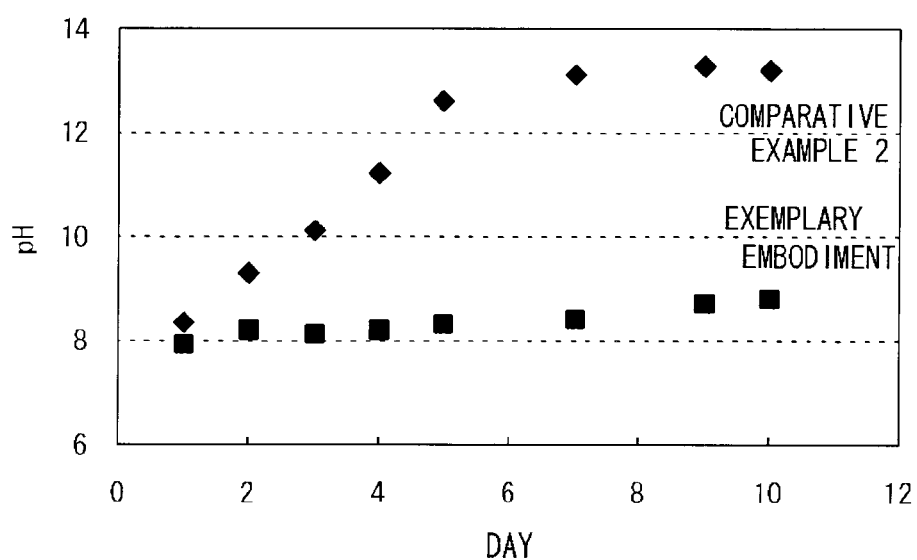
FIG. 3 is a graph illustrating changes in pH of a positive electrode active material paste according to an exemplary embodiment of the present invention and Comparative Example 2.

FIG. 3 and Table 2 clearly show that in the positive electrode active material paste of the example having $CO_2$ microbubbles admixed thereto, pH practically 8 did not rise from about 8 and even after 10 days the pH value of 8.8, that is, close to neutral was exhibited. By contrast, the positive electrode active material paste of Comparative Example 2 that was neutralized by the usual $CO_2$ bubbling treatment practically did not maintain the neutral effect and the pH value after 10 days was 13. This was apparently because the retention time of the $CO_2$ microbubbles in the paste was long and the microbubbles gradually reduced in size and slowly dissolved in the paste, thereby sustaining the neutralization effect longer than with the typical $CO_2$ bubbling treatment. This result confirmed that admixing carbon dioxide gas as microbubbles can effectively neutralize the positive electrode active material paste.

Figure 4:
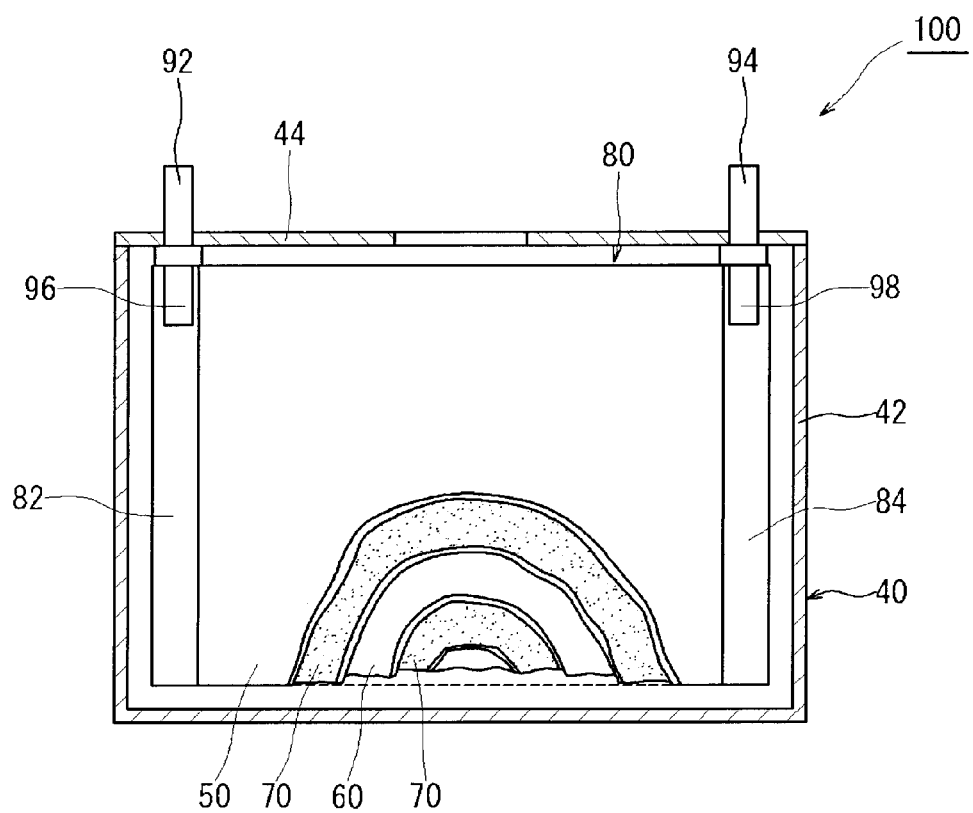
FIG. 4 illustrates schematically a lithium ion secondary battery according to one embodiment of the present invention.

An embodiment of a lithium ion battery constructed by using the sheet-like positive electrode (positive electrode sheet) manufactured by applying the method in accordance with the present invention will be described below with reference to a schematic diagram shown in FIG. 4.

As shown in the figure, a lithium ion battery 100 of the present embodiment has a metallic case 40 (a resin or laminated film case may be also used). This case (outer container) 40 has a case body 42 in the shape of a flat rectangular parallelepiped with an opened upper end and a lid body 44 that closes the opening. A positive electrode terminal 92 that is electrically connected to a positive electrode of a wound electrode body 80 and a negative electrode terminal 94 that is electrically connected to a negative electrode of the electrode body 80 are provided at the upper surface (that is, the lid body 44) of the case 40. The flat-shaped wound electrode body 80 that is fabricated, for example, by laminating an elongated sheet-like positive electrode (positive electrode sheet) 50 and an elongated sheet-like negative electrode (negative electrode sheet) 60 together with a total of two elongated sheet-like separators (separator sheets) 70, winding the laminate, and then flattening the obtained wound body from the side surface direction is accommodated inside the case 40.

The positive electrode sheet 50 and negative electrode sheet 60 have a configuration in which an electrode active material layer having an electrode active material as the main component is provided on both surfaces of the elongated sheet-like electrode collector. An electrode active material layer non-formation portion in which the electrode active material layer has not been provided is formed at both surfaces at one end in the widthwise direction of these electrode sheets 50, 60. When the aforementioned lamination is performed, the positive electrode sheet 50 and negative electrode sheet 60 are stacked with a certain displacement in the widthwise direction so that the positive electrode active material layer non-formation portion of the positive electrode sheet 50 and the negative electrode active material layer non-formation portion of the negative electrode sheet 60 protrude from both sides in the widthwise direction of the separator sheet 70. As a result, the electrode active material layer non-formation portions of the positive electrode sheet 50 and negative electrode sheet 60 protrude to the outside from respective wound core portions (that is, portions where the positive electrode active material layer non-formation portion of the positive electrode sheet 50 and the negative electrode active material layer non-formation portion of the negative electrode sheet 60 are tightly wound together with the two separator sheets 70) in the transverse direction with respect to the winding direction of the wound electrode body 80. A positive electrode lead terminal 96 and a negative electrode lead terminal 98 are attached to the positive electrode protruding portion (that is, the positive electrode active material layer non-formation portion) 82 and the negative electrode protruding portion (that is, the negative electrode active material layer non-formation portion) 84, respectively, and eclectically connected to the aforementioned positive electrode terminal 92 and negative electrode terminal 94, respectively.

Constituent elements other than the positive electrode sheet 50 constituting the wound electrode body 80 are not particularly limited and may be similar to those of the electrode body of the conventional lithium ion secondary battery. For example, the negative electrode sheet 60 has a negative electrode active material layer formed on the surface of an elongated negative electrode collector. A copper foil (present embodiment) and other metal foils suitable for the negative electrode can be advantageously used for the negative electrode collector. One, or two or more substances that have been conventionally used in lithium ion batteries can be used without any particular limitation as the negative electrode active material. In a preferred example, a carbon-containing material such as graphite carbon and amorphous carbon, a lithium transition metal composite oxide (lithium titanium composite oxide and the like), and a lithium transition metal composite nitride is used.

The preferred separator sheet 70 used between the positive and negative electrode sheets 50, 60 is constituted by a porous polyolefin resin. For example, a porous separator sheet made from a synthetic resin (for example, from a polyolefin such as polyethylene) with a thickness of about 5 to 30 μm (for example, 25 μm) can be advantageously used. In a case where a solid electrolyte or a gelled electrode is used as the electrolyte, the separator is sometimes unnecessary (that is, the electrolyte itself can function as the separator).

A method by which a negative electrode active material power and other components forming the negative electrode active material layer are dispersed in an appropriate solvent (preferably, an aqueous solvent) to prepare a negative electrode active material paste that is coated on one or both sides of a negative electrode collector in a band-like fashion and dried can be advantageously used as a method for forming the negative electrode active material layer. If necessary, an appropriate press treatment (for example, various well-known conventional press methods such as a roll press method and a flat plate press method can be used) can be implemented after the negative electrode active material paste has been dried in order to adjust appropriately the thickness and density of the negative electrode active material layer.

The preferred separator sheet 70 used between the positive and negative electrode sheets 50, 60 can be constituted by a porous polyolefin resin. For example, a porous separator sheet made from a synthetic resin (for example, from a polyolefin such as polyethylene) can be advantageously used. In a case where a solid electrolyte or a gelled electrode is used as the electrolyte, the separator is sometimes unnecessary (that is, the electrolyte itself can function as the separator).

The wound electrode body 80 of such a configuration is accommodated in the cast body 42, and an appropriate nonaqueous electrolytic solution is disposed in (poured into) the case body 42. A nonaqueous electrolytic solution similar to that used in the conventional lithium ion batteries can be used without any particular limitation and the nonaqueous electrolytic solution accommodated together with the wound electrode body 80 inside the case body 42. The nonaqueous electrolytic solution typically has a composition in which a support salt is contained in an appropriate nonaqueous solvent. For example, a nonaqueous electrolytic solution can be used in which $LiPF_6$ as a support salt is contained at a concentration of about 1 mol/L in a mixed solvent containing ethylene carbonate (EC), ethyl methyl carbonate (EMC), and dimethyl carbonate (DMC) at a volume ratio of 3:4:3.

The construction (assembling) of the lithium ion secondary battery 100 of the present embodiment is completed by accommodating the nonaqueous electrolytic solution together with the wound electrode body 80 in the case body 42 and sealing the opening of the case body 42 with the lid body 44. The process of sealing the case body 42 and the process of disposing (pouring) the electrolytic solution can be performed in the same manner as in the manufacture of the conventional lithium ion secondary batteries.

Because the lithium ion secondary battery in accordance with the present invention excels in battery performance, as mentioned hereinabove, the battery can be advantageously used as a power source for a motor (electric motor) to be installed on a vehicle such as an automobile. Therefore, the present invention provides a vehicle (typically, an automobile, in particular an automobile equipped with an electric motor, such as a hybrid automobile, electric automobile, and a fuel cell automobile) that is provided with such a lithium ion secondary battery (may be a battery assembly in which a plurality of such batteries are connected in series) as a power source.

The present invention is described based on preferred embodiments, but the description above is not limiting and it goes without saying that various modifications are possible. For example, the electrode manufacturing method in accordance with the present invention can be applied without distinguishing the polarity. Thus, this method is not limited to the above-described positive electrode and can be also applied to a negative electrode.

INDUSTRIAL APPLICABILITY

With the method in accordance with the present invention, coating defects of an electrode active material paste can be avoided and an electrode that excels in stability of quality can be manufactured.

The invention claimed is:

1. A method for manufacturing a battery electrode having a configuration in which an electrode active material layer including an electrode active material is held on an electrode collector, the method comprising:
a step of mixing the electrode active material with a solvent and preparing an electrode active material paste;
a step of admixing microbubbles to the prepared electrode active material paste and preparing the electrode active material paste in which microbubbles are retained; and
a step of forming an electrode active material layer by coating the electrode collector with the electrode active material paste in which microbubbles are retained,
wherein the step of the admixing microbubbles is performed by adding water including microbubbles to the electrode active material paste.

2. The manufacturing method according to claim 1, wherein gas bubbles with a diameter of equal to or less than 50 μm are admixed as the microbubbles in the step of admixing microbubbles.

3. The manufacturing method according to claim 1, wherein carbon dioxide gas is admixed as the microbubbles in the step of admixing microbubbles.

4. The manufacturing method according to claim 3, wherein pH of the electrode active material paste is adjusted to 7 to 10 by the admixing of the carbon dioxide gas in the step of admixing microbubbles.

5. The manufacturing method according to claim 4, wherein
the electrode is a positive electrode for a lithium secondary battery, and
a lithium-containing composite oxide including lithium and one, or two or more transition metal elements as constituent metal elements is used as the electrode active material.

6. The manufacturing method according to claim 5, wherein foil-shaped aluminum or an aluminum alloy is used as the electrode collector.

7. The manufacturing method according to claim 1, wherein
the electrode is a positive electrode for a lithium secondary battery, and
a lithium-containing composite oxide including lithium and one, or two or more transition metal elements as constituent metal elements is used as the electrode active material.

8. The manufacturing method according to claim 7, wherein foil-shaped aluminum or an aluminum alloy is used as the electrode collector.

9. The manufacturing method according to claim 1, wherein the electrode active material paste in which the total volume of gas bubbles container per 1 $cm^3$ of the paste is 0.1 $cm^3$ to 0.5 $cm^3$ are coated on the collector in the step of forming an electrode active material layer.

10. A method for manufacturing a battery electrode having a configuration in which an electrode active material layer including an electrode active material is held on an electrode collector,
the method comprising:
a step of mixing the electrode active material with a solvent and preparing an electrode active material paste;
a step of reducing a density of the electrode active material paste by admixing microbubbles to the prepared electrode active material paste;
a step of evacuating the electrode active material paste; and
a step of forming an electrode active material layer by coating the electrode collector with the electrode active material paste having reduced density.

* * * * *